Patented Aug. 21, 1928.

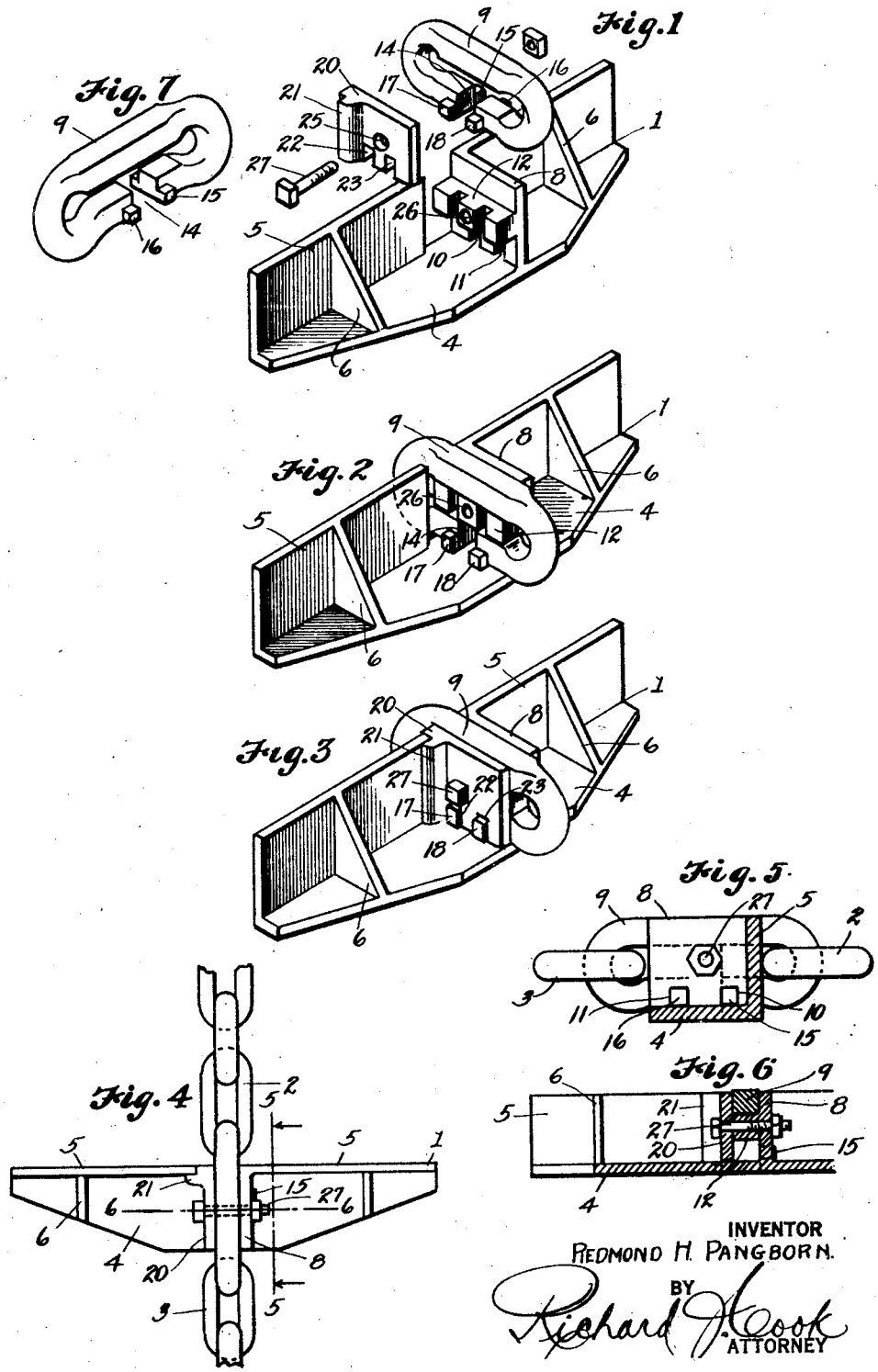

1,681,429

UNITED STATES PATENT OFFICE.

REDMOND H. PANGBORN, OF TACOMA, WASHINGTON.

CONVEYER FLIGHT.

Application filed April 28, 1924. Serial No. 709,420.

This invention relates to improvements in conveyers, and more particularly to a conveyer flight, designed primarily for a saw mill slab conveyer but which is also readily applicable to chain, or cable, conveyers as are used in mines, elevators, dredges or for various other purposes.

Heretofore, it has been common practice to fasten the flights permanently to the conveyer chain by riveting or welding, but this method has proven to be very impractical, expensive and undesirable for the reason that should any flight be damaged so that its removal from the chain becomes necessary, the entire conveyer system had to be stopped while the damaged flight was removed and replaced, which due to the method of attaching by riveting or other permanent connections, required considerable time and incurred considerable expense.

In view of the undesirability of thus attaching the flights, it has been the principal object of this invention to provide a flight of durable and substantial construction adapted for removable connection with a conveyer chain; the construction being such that the connection may be made in a rigid and substantial manner through the agency of interlocking parts held together by a single bolt.

More specifically stated, the invention resides in the provision of a conveyer flight consisting of an angle iron bar equipped centrally with a transverse flange to which a link of a conveyer chain may be disconnectably and rigidly attached. And furthermore to provide the attaching link with an opening at one side which permits it to be readily attached to or released from the flight connecting sections of a conveyer chain.

Other objects reside in the various details of construction and combination of parts hereinafter described.

In accomplishing these and other objects of the invention, I have provided the improved details of construction, the preferred forms of which are illustrated in the accompanying drawings, wherein—

Figure 1 is a perspective view of a conveyer flight embodied by the present invention; showing its attaching link and plate in disconnected relation for better illustration.

Figure 2 is a similar view, showing the assembled relation of the link and flight.

Figure 3 is a perspective view of the parts assembled and secured together.

Figure 4 is a plan view of the flight connected in a conveyer chain.

Figure 5 is a transverse, sectional view taken on the line 5—5 in Figure 4.

Figure 6 is a sectional view taken on the line 6—6 in Figure 4.

Figure 7 is a perspective view of the attaching link, showing the side opposite that shown in Figures 1 and 2.

Referring more in detail to the several views of the drawings—

1 designates, as a whole, the conveyer flight and 2 and 3 sections of a chain whereby the flight is joined with other of such flights in a continuous belt to form the conveyer. In its preferred construction, the flight consists of an angle iron bar embodying the base, or horizontal flange 4 and a vertical flange 5 that is braced from the base flange by the two webs 6 near its ends.

At a point centrally of the flight, the flange 5 is cut away down to the base flange to provide a recess 7 and continuing from the flange, at one side of the recess and at right angles to the flange, is a web or flange 8 serving as an abutment against which an attaching link 9 may seat, as shown best in Figure 2. The flange 8, for a purpose presently described, is provided adjacent the base flange, with two spaced apart apertures 10 and 11, and above these, on the side adjacent the recess 7, has a transverse lug 12 thereon that is spaced from and is parallel with the base flange of the flight.

The link 9 has an open space 14 in its lower section which permits it to be attached or detached from the end links of the chain sections 2 and 3 and the ends, at opposite sides of this open space, are provided on one side with laterally projecting lugs 15 and 16 that are adapted, when the link is assembled with the flight, to fit within the openings 10 and 11 in the flange 8. On its other side of the link are similarly projecting lugs 17 and 18 that are adapted to project within notches of a clamping plate presently described.

After the link 9 has been connected with the chain sections 2 and 3, and has been properly positioned with respect to the flange 8 of the flight, it is then clamped and locked by means of a plate 20 that seats against the outer face of the link, as shown in Figure 3. One edge of the plate fits tightly between the link and edge of recess 7 and has a flange 21 abutting against the edge of the flange 5. In the lower edge of the plate are notches 22 and 23 adapted to receive the lugs 17 and 18 on the outer face of the link, and centrally of the plate is an opening 25 adapted to register with a hole 26 through the lug 12 and flange 8 to receive a bolt 27 whereby the parts may be locked together.

Assuming that the parts are so constructed and are assembled as described, should the flight for any reason need to be removed and replaced, the bolt 27 is first removed so that plate 20 may be lifted out. The link 9 is then shifted outwardly to free the lugs 15 and 16 from the openings 10 and 11 in flange 8 and to unseat it from about the lug 12 and it may then be lifted free of the flight.

If a new flight is inserted, the link 9 is moved into recess 7 and its upper and lower sections seated against the flange 8 along opposite sides of lug 12, with the lugs 15 and 16 on the link seated in the openings 10 and 11. The plate 20 is then moved downwardly so that one edge fits tightly between the link and edge of recess 7 and its two notches 22 and 23 receiving the lugs 17 and 18. The bolt 27 is then inserted through openings 25 and 26 and by means of a nut threaded onto the bolt all parts are clamped tightly together.

The construction, while permitting of ready assembly or disassembly of parts, provides a very rigid and substantial construction. It also permits, due to the open link and the fact that it can be easily and readily disconnected from the flight, the removal and replacing of broken chain sections between flights.

Such flights are especially suitable for use with conveyers in saw mills, mines, elevators, coaling stations, dredges, etc., and can be made in various sizes in accordance with the purpose for which they are used.

Having thus described my invention, what I claim as new therein and desire to secure by Letters-Patent, is:

1. The combination with adjacent sections of a conveyer chain belt, of a conveyer flight, an open chain link disconnectably joining the said sections and serving as a part of the belt; said link having parts thereof adapted to engage in rigid interlocking relation with the body of the flight and means for retaining them in this relation.

2. The combination with a conveyer chain of a link in said chain having a side opening whereby it may be detached and having lugs thereon and a conveyer flight provided with openings adapted to receive the said lugs to provide a rigid connection between the link and flight.

3. The combination with adjacent sections of a conveyer chain, of a chain link joining the said sections and having a side opening whereby it may be detached therefrom, and having lugs thereon at opposite sides of the opening and a conveyer flight having apertures for receiving said lugs to provide an interlocked connection and means for retaining the parts in this relation.

4. The combination with a conveyer chain, of a flight having a transverse flange thereon provided with spaced apertures, a chain link adapted to be seated flatly against said flange and having an opening at one side whereby it is insertable in the chain to form a part thereof and provided at opposite sides of the opening with laterally projecting lugs insertable into said flange openings, and means for securing the link to the said flange.

5. A conveyer flight comprising a bar with a transverse flange having spaced openings therein, a chain link adapted to seat flatly against the said flange with its ends extended forwardly and rearwardly of the flight and having an opening in one side whereby, when detached from the flight, it is applicable to flight connecting sections of a conveyer chain, and having laterally projecting lugs thereon at opposite sides of said opening applicable to said flange openings, a plate disposed against the link at the side opposite the flange and a bolt extended through the plate and securing it to the flange.

6. A conveyer flight comprising an angle iron bar, one flange of which is provided centrally with a recess, a flange formed transversely of the bar at one side of the recess having two spaced openings therein, a chain link disposed flatly against the apertured flange and extended through said recess; said link having an opening in one side whereby it is removably applicable to the flight connecting chain sections of a conveyer belt and provided at each side of the opening with lugs extended laterally from both sides of the link with those at one side removably interlocked in the said openings of the transverse flange, and a clamping plate overlying the outer side of the link having notches therein for receiving the outwardly projecting lugs at that side of the link and a bolt extended through the plate and transverse flange to detachably secure the parts together.

7. A conveyer flight comprising an angle iron bar having a vertical flange provided centrally with a recess and a flange formed transversely of the bar at one side of the recess having a lug thereon spaced from and parallel with the base flange and having two spaced apart openings therein beneath the lug, a chain link disposed flatly against the apertured flange and over the said lug and extending through the flange recess; said link having an opening in its lower section whereby it is removably applicable to the connecting sections of a conveyer belt, and is provided at opposite sides of the opening with lugs extending laterally from both sides of the link, with the lugs at one side of the link removably interlocked in the said openings of the transverse flange and a flanging plate overlying the outer face of the link having one edge fitted tightly between the link and each of the flange recesses, and having notches in its lower edge adapted to receive the projecting lugs in that side of the link and a bolt removably extended through the plate and clamping it against the link and transverse flange.

Signed at Tacoma, Pierce County, Washington, U. S. A., this 4th day of April, 1924.

REDMOND H. PANGBORN.